United States Patent
Zhang et al.

(10) Patent No.: US 11,161,611 B2
(45) Date of Patent: Nov. 2, 2021

(54) METHODS AND SYSTEMS FOR AIRCRAFT COLLISION AVOIDANCE

(71) Applicants: Yan Zhang, Newton, MA (US); Gerard Fairley, Acton, MA (US)

(72) Inventors: Yan Zhang, Newton, MA (US); Gerard Fairley, Acton, MA (US)

( * ) Notice: Subject to any disclaimer, the term of this patent is extended or adjusted under 35 U.S.C. 154(b) by 3 days.

(21) Appl. No.: 16/815,832

(22) Filed: Mar. 11, 2020

(65) Prior Publication Data

US 2021/0197966 A1 Jul. 1, 2021

Related U.S. Application Data

(60) Provisional application No. 62/819,003, filed on Mar. 15, 2019.

(51) Int. Cl.
| | |
|---|---|
| *B64C 39/02* | (2006.01) |
| *G08G 1/16* | (2006.01) |
| *G08G 5/00* | (2006.01) |
| *G05D 1/00* | (2006.01) |
| *G08G 5/04* | (2006.01) |
| *G05D 1/10* | (2006.01) |

(52) U.S. Cl.
CPC ......... *B64C 39/024* (2013.01); *G05D 1/1064* (2019.05); *G08G 5/0008* (2013.01); *G08G 5/045* (2013.01); *B64C 2201/141* (2013.01)

(58) Field of Classification Search
CPC . B64C 39/024; B64C 2201/141; B64C 39/02; G08G 5/0008; G08G 5/045; G08G 5/00; G05D 1/1064; G05D 1/00; G01C 21/00; G01C 21/10; G01C 21/20
See application file for complete search history.

(56) References Cited

U.S. PATENT DOCUMENTS

| | | | | | |
|---|---|---|---|---|---|
| 6,133,867 | A * | 10/2000 | Eberwine | ............... | G01S 5/0072 342/125 |
| 6,459,411 | B2 * | 10/2002 | Frazier | ................... | G01C 23/00 342/455 |
| 6,657,578 | B2 * | 12/2003 | Stayton | ................ | G08G 5/0008 342/29 |
| 6,748,325 | B1 * | 6/2004 | Fujisaki | ................. | G01C 21/00 701/301 |
| 7,714,744 | B1 * | 5/2010 | Wichgers | ............... | G08G 5/045 340/965 |

(Continued)

FOREIGN PATENT DOCUMENTS

GB 2011117242 9/2011

OTHER PUBLICATIONS https://www.ll.mit.edu/sites/default/files/page/doc/2018-05/19_1_1_Kochenderfer.pdf.

*Primary Examiner* — Yonel Beaulieu
(74) *Attorney, Agent, or Firm* — Caldwell Intellectual Property Law, LLC

(57) ABSTRACT

A system for aircraft collision avoidance includes a first aircraft, the first aircraft configured to detecting at least a projected flight path of at least a second aircraft, determine, as a function of the at least a projected flight path, that the first aircraft is on a collision course with the at least a second aircraft, select a collision avoidance maneuver, the collision avoidance maneuver including at least a flight path for the first aircraft and at least a flight path for the at least a second aircraft, and transmit the collision avoidance maneuver to the at least a second aircraft.

20 Claims, 5 Drawing Sheets

(56) References Cited

U.S. PATENT DOCUMENTS

| | | | |
|---|---|---|---|
| 8,234,020 B1* | 7/2012 | Wichgers | G08G 5/0021 |
| | | | 701/9 |
| 8,977,482 B2 | 3/2015 | Ballin et al. | |
| 9,286,807 B2 | 3/2016 | Sundqvist | |
| 10,109,207 B2 | 10/2018 | Bousquet et al. | |
| 10,140,878 B2 | 11/2018 | Schupp et al. | |
| 10,157,547 B2 | 12/2018 | Farjon | |
| 10,170,008 B2 | 1/2019 | Shay | |
| 2007/0222665 A1* | 9/2007 | Koeneman | G08G 5/0021 |
| | | | 342/29 |
| 2009/0088972 A1* | 4/2009 | Bushnell | G08G 5/045 |
| | | | 701/414 |
| 2011/0166836 A1* | 7/2011 | Kaplan | G08G 5/0043 |
| | | | 703/2 |
| 2012/0209457 A1* | 8/2012 | Bushnell | G08G 5/0078 |
| | | | 701/13 |
| 2014/0019034 A1* | 1/2014 | Bushnell | G01C 23/005 |
| | | | 701/122 |
| 2014/0309916 A1* | 10/2014 | Bushnell | G01C 23/005 |
| | | | 701/122 |
| 2016/0275801 A1* | 9/2016 | Kopardekar | G08G 5/0069 |
| 2018/0033318 A1 | 2/2018 | Yeh | |
| 2018/0137765 A1 | 5/2018 | Sindlinger et al. | |
| 2018/0170573 A1 | 6/2018 | Wang et al. | |
| 2018/0246200 A1 | 8/2018 | Goossen et al. | |
| 2020/0111375 A1* | 4/2020 | Garden | G08G 5/0017 |
| 2021/0197966 A1* | 7/2021 | Zhang | G08G 5/0008 |
| 2021/0214100 A1* | 7/2021 | Thayer | B64C 39/024 |

* cited by examiner

METHODS AND SYSTEMS FOR AIRCRAFT COLLISION AVOIDANCE

CROSS-REFERENCE TO RELATED APPLICATIONS

This application claims the benefit of priority of U.S. Provisional Patent Application Ser. No. 62/819,003 filed on Mar. 15, 2019 and entitled METHODS AND SYSTEMS FOR AIRCRAFT COLLISION AVOIDANCE," which is incorporated by reference herein in its entirety.

FIELD OF THE INVENTION

The present invention generally relates to the field of automated vehicular navigation. In particular, the present invention is directed to methods and systems for aircraft collision avoidance.

BACKGROUND

In the past few decades a rapid increase of unmanned aerial vehicles (UAV) has occurred, both in military and commercial use. Even without the introduction of UAVs airspaces are becoming increasingly crowded; the massive increases in UAVs have greatly exacerbated this crowding. Integration of UAVs into the national and international airspaces without sacrificing safety has proved to be a great challenge.

SUMMARY OF THE DISCLOSURE

In an aspect, a method of aircraft collision avoidance includes detecting, by a first aircraft, at least a projected flight path of at least a second aircraft. The method includes determining, by the first aircraft and as a function of the at least a projected flight path, that the first aircraft is on a collision course with the at least a second aircraft. The method includes selecting a collision avoidance maneuver, the collision avoidance maneuver including at least a flight path for the first aircraft and at least a flight path for the at least a second aircraft. The method includes transmitting the collision avoidance maneuver to the at least a second aircraft.

In another aspect, a system for aircraft collision avoidance includes a first aircraft, the first aircraft configured to detecting at least a projected flight path of at least a second aircraft, determine, as a function of the at least a projected flight path, that the first aircraft is on a collision course with the at least a second aircraft, select a collision avoidance maneuver, the collision avoidance maneuver including at least a flight path for the first aircraft and at least a flight path for the at least a second aircraft, and transmit the collision avoidance maneuver to the at least a second aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an embodiment, systems and methods disclosed herein enable aircraft and/or flight controllers to choose and agree on collision avoidance maneuvers rapidly and effectively. A major concern of the safety for UAVs integrating into the existing airspaces is a communication delay or loss that may result in the UAV changing course or altitude without clearance. Each UAV may have a control link and a communication link, enabling a pilot-in-command (PIC) to control the UAV by radio or satellite and communicate with air traffic control (ATC). In addition, the pilot may communicate with the ATC via a ground relay; the voice communication link between the UAV pilot and ATC can lack the reliability of the link between manned aircraft pilots and ATC since there is in general an additional link for the PIC. Communication link also experiences additional latencies and degradations due to the atmosphere. In some instances, a UAV may be beyond radio coverage from the pilot in command; a satellite relay may link the pilot to the UAV to deliver voice communications between the UAV and the ATC. However, this may add a communications delay. The above-described conditions may introduce some amount of control and communication latency, with the result that collision avoidance protocols may take too long to prevent certain collisions. The combined delays in receipt of and response to ATC instructions may adversely affect aircraft separation and control and hence the safety of other elements of the airspace and ground infrastructure. Communication links at any point in the above-described communication may also be lost; since link-loss procedures are generally not part of all ATC automation systems ATC may not be immediately aware that a lost link has occurred. Embodiments described below advantageously alleviate all of these problems by enabling a more rapid collision avoidance decision and communication process which also may function autonomously in the event of one or more lost communication links.

Figure 1:
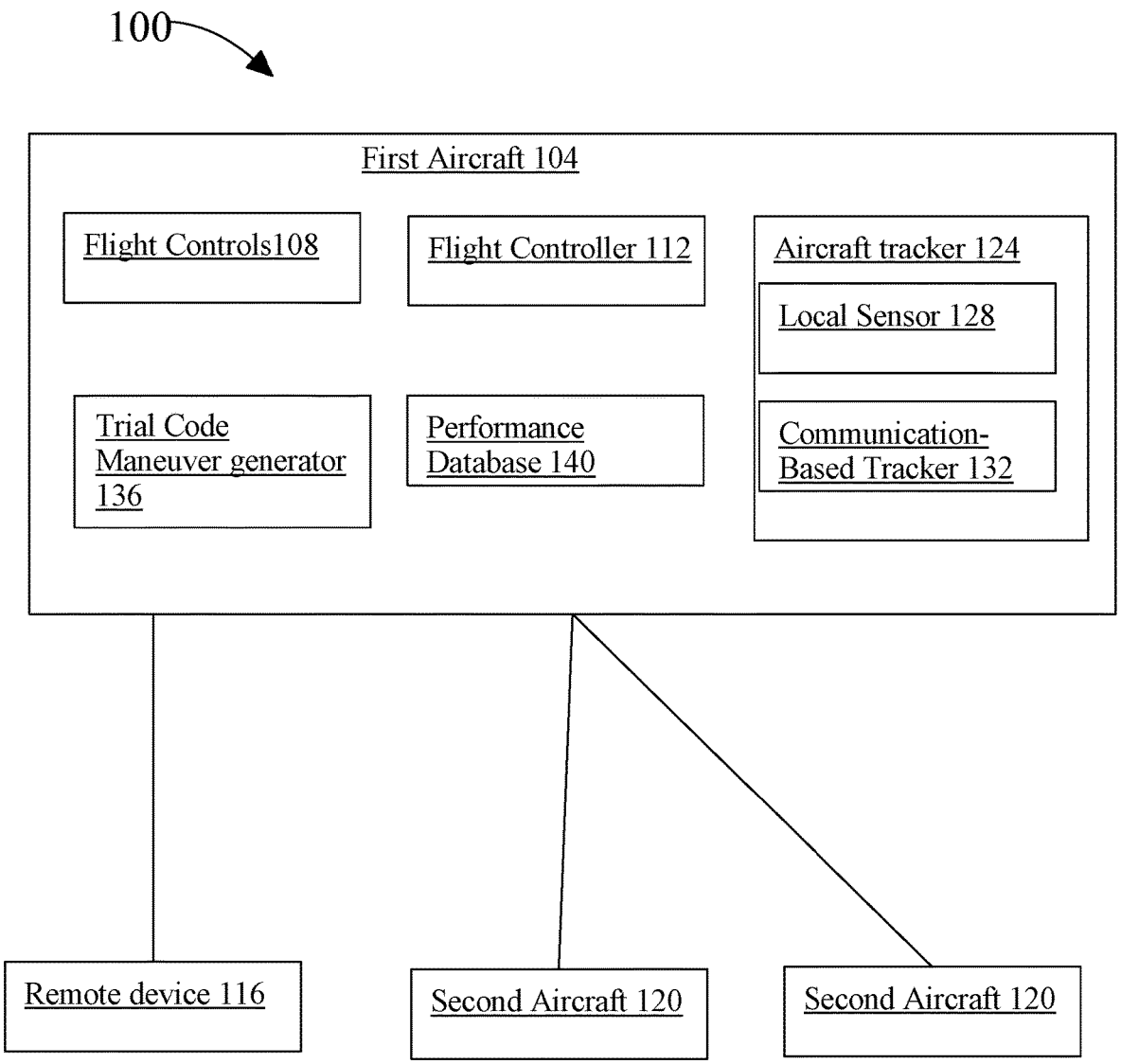
FIG. 1 is a block diagram illustrating an exemplary embodiment of a system for aircraft collision avoidance.

Referring now to FIG. 1, an exemplary embodiment of a system 100 for aircraft collision avoidance is illustrated. The system includes a first aircraft 104. First aircraft 104 may include any vehicle that performs navigational maneuvers through flight. First aircraft 104 may include one or more components that generate lift, including without limitation wings, airfoils, rotors, downward-projecting propulsors such as propellers, jet engines, or the like, lighter-than-air components such as hot air balloons and/or gas envelopes and/or balloons or gas envelopes filled with lighter-than-air gasses, or any other component or feature that may be used to climb and/or maintain an altitude during flight. First aircraft 104 may include, without limitation, an airplane, a rotor craft such as a helicopter, a drone, an autogiro, a dirigible, a hot air balloon, an aircraft containing any combination of elements of the above-described examples, and/or any other aircraft, as consistent with descriptions in this disclosure that may occur to a person skilled in the art, upon reviewing the entirety of this disclosure.

Still referring to FIG. 1, first aircraft 104 may include a UAV. A UAV may include an aircraft that does not contain a human passenger. A UAV may be navigated using one or more automated flight controls 108, such as electronically actuated or "fly-by-wire" controls. One or more controls may be operated remotely by a person or computing device in a different location, such as another aircraft, a ground-based vehicle, a stationary location on the ground, or the like. UAV flight controls 108 may alternatively or additionally be operated by one or more automated systems installed on first aircraft 104. First aircraft may include, without limitation, a toy or hobbyist's aircraft such as a remote-controlled "drone." Toy aircraft may include any elements suitable for use in large aircraft such as propellers, rotors, foils, and the like; elements may be miniaturized and/or otherwise modified as suitable for use in smaller aircraft. Toy aircraft may be operated using any form of signal suitable for use for communication with aircraft as described in this disclosure, including information received in radio-frequency form or the like.

With continued reference to FIG. 1, first aircraft 104 may include a flight controller 112. Flight controller 112 may include any computing device, or combination of computing devices, as described below in reference to FIG. 7. Flight controller 112 may include a microprocessor, microcontroller, system-on-a-chip, or the like. Flight controller 112 may be configured to perform any or all steps of any embodiment of method 200, as described in further detail below, with any number of repetitions or iterations; alternatively a remote device 116 may perform some or all of the method steps as described below and send data to flight controller 112. First aircraft 104 may be considered to be "configured" to perform a method step or other function as described herein where an onboard flight controller 112 and/or remote device 116 in communication with the online flight controller 112 is configured to perform the steps. In an embodiment, first aircraft and/or flight controller 112 may be configured to detecting at least a projected flight path of at least a second aircraft 120, determine, as a function of the at least a projected flight path, that the first aircraft 104 is on a collision course with the at least a second aircraft 120, select a collision avoidance maneuver, the collision avoidance maneuver including at least a flight path for the first aircraft 104 and at least a flight path for the at least a second aircraft 120, and transmit the collision avoidance maneuver to the at least a second aircraft 120, as set forth in further detail below.

In an embodiment and continuing to refer to FIG. 1, flight controller 112 may be programmed to operate first aircraft 104 to perform a flight maneuver. As described herein, at least a flight maneuver may include takeoff, landing, stability control maneuvers, emergency response maneuvers, regulation of altitude, roll, pitch, yaw, speed, acceleration, or the like during any phase of flight. As an example and without limitation, at least a flight maneuver may include a flight plan or sequence of maneuvers to be performed during a flight plan. As a further example and without limitation, at least a flight maneuver may include a runway landing. A runway landing, as defined herein, is a landing in which a fixed-wing aircraft, or other aircraft that generates lift by moving a foil forward through air, flies forward toward a flat area of ground or water, alighting on the flat area and then moving forward until momentum is exhausted on wheels or, in the case of landing on water, pontoons; momentum may be exhausted more rapidly by reverse thrust using propulsors, mechanical braking, electric braking, or the like. As a further non-limiting example, a flight maneuver may include a vertical landing protocol. Vertical landing protocol may include, without limitation, a rotor-based landing, such as one performed by rotorcraft such as helicopters or the like. In an embodiment and without limitation, vertical landing protocols may require greater expenditure of energy than runway-based landings. Vertical landing protocol may, for instance and without limitation, require substantial expenditure of energy to maintain a hover or near-hover while descending, while runway-based landings may, as a non-limiting example, require a net decrease in energy to approach or achieve aerodynamic stall. Flight controller 112 may be designed and configured to operate first aircraft 104 via fly-by-wire.

With continued reference to FIG. 1, flight controller 112 may direct components of first aircraft 104, including without limitation propellers, rotors, flaps, rudders, ailerons, spoilers, leading edge slats and/or slots, airbrakes, or other devices or components affecting velocity, heading, and/or lift of first aircraft 104, to perform one or more flight maneuvers as described above, including takeoff, landing, and the like. As an example and without limitation, flight controller 112 may be configured to perform a partially and/or fully automated flight plan. Persons skilled in the art will be aware, upon reviewing the entirety of this disclosure, of various combinations of sensor inputs and programming inputs that flight controller 112 may use to guide, modify, or initiate flight maneuvers including landing, steering, adjustment of route, and the like.

Continuing to refer to FIG. 1, flight controller 112 may be incorporated in aircraft 104; alternatively or additionally, flight controller 112 and/or one or more elements thereof may be external to aircraft. For instance, flight controller 112 may operate aircraft wirelessly using a remote control procedure and/or protocol. An external flight controller 112 may receive transmissions from aircraft 104 or other devices as described in this disclosure; such transmissions may describe information generated by sensors mounted to and/or incorporated in aircraft 112, information generated by and/or using communication-based flight tracking as described in further detail below, or the like. An external flight controller 112 may transmit commands to first aircraft and/or one or more components thereof, to perform one or more flight maneuvers; commands may directly control first aircraft 104 and/or may provide instructions to a processor and/or computing device such as a flight controller 112 on first aircraft 104 to perform the flight maneuvers. For instance, and without limitation, where flight controller 112 is external to first aircraft 104, flight controller may transmit maneuver codes as described below to first aircraft 104.

Still referring to FIG. 1, flight controller 112 may be designed and/or configured to perform any method, method step, or sequence of method steps in any embodiment described in this disclosure, in any order and with any degree of repetition. For instance, flight controller 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 112 and/or other computing devices described in this disclosure may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, first aircraft and/or flight controller 112 may include an aircraft tracker 124. Aircraft tracker 124 may include a device or suite of devices that operate to detect at least a second aircraft 120. Aircraft tracker 124 may include a local sensor 128. Local sensor 128 may be any sensor mounted to first aircraft 104 that senses objects or phenomena in the environment around the first aircraft 104. Local sensor 128 may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or any other local sensor 128 that may occur to a person having ordinary skill in the art upon. Aircraft tracker 124 may include a sense-and-avoidance system (SAA) that detects and avoids collisions. SAA may include traffic collision avoidance system (TCAS) and ground-based sense-and-avoid (GBSAA) using primary radar. SAA may operate one or more protocols requiring first aircraft 104 to remain well clear from and avoid collisions with other airborne traffic. SAA may also perform one or more protocols to compensate for the lack of an on-board pilot, and to define an operational concept that will enable the SAA-equipped aircraft to smoothly integrate into an air traffic services environment. For instance, a computer model or common algorithm, similar in scope to TCAS but utilizing a different algorithm may be utilized. SAA may be equal to or better than the see-and-avoid capability of a manned aircraft. Local sensor may include sensors suitable for use by toy aircraft as described above for use in collision avoidance.

With further reference to FIG. 1, local sensor may include, as an example and without limitation, an environmental sensor. As used herein, an environmental sensor may be used to detect ambient temperature, barometric pressure, air velocity, motion sensors which may include gyroscopes, accelerometers, inertial measurement unit (IMU), various magnetic, humidity, and/or oxygen. As another non-limiting example, local sensor may include a geospatial sensor. As used herein, a geospatial sensor may include optical/radar/Lidar, GPS and may be used to detect aircraft location, aircraft speed, aircraft altitude and whether the aircraft is on the correct location of the flight plan. A local sensor may be located inside first aircraft 104; sensor may be inside a component of the aircraft 104. In an embodiment, environmental sensor may sense one or more environmental conditions or parameters outside the first aircraft 104, inside the first aircraft 104, or within or at any component thereof, including without limitation an energy source, a propulsor, or the like. An environmental sensor may further collect environmental information from the predetermined landing site, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Local sensor may detect an environmental parameter, a temperature, a barometric pressure, a location parameter, and/or other necessary measurements. Local sensor may include an altimeter. Persons skilled in the art, upon reviewing the entirety of this disclosure, will be aware of various alternative or additional components and/or devices that may be employed as local sensor.

Still referring to FIG. 1, aircraft tracker 124 may include a communication-based detector 132. Communication-based detector 132 may be a device that performs surveillance, aircraft detection, and the like via communication with one or more devices outside of first aircraft 104, which convey to first aircraft and/or flight controller 112 data concerning at least a second aircraft 120. Communication-based detector 132 may include without limitation, a device that communicates according to a Secondary Surveillance Radar (SSR) system, whereby one or more radar stations use radar to interrogate transponders attached to or contained in aircraft and receive information in response describing such information as aircraft identity, codes describing flight plans, codes describing destination, and the like; responses enable the one or more radar stations to determine current position and trajectory of aircraft, intended future trajectories, and other details concerning current and future courses of flight by the aircraft. SSR systems may also use primary RADAR to detect objects in the air, including aircraft, and supplement the transponder information. Information collected and determined by SSR may be automatically broadcast to aircraft, enabling a communication-based detector 132 of first aircraft and/or flight controller 112 to determine one or more positions and/or projected future flight paths for at least a second aircraft 120. SSR may utilize any suitable interrogation mode, including Mode S interrogation for generalized information. Communication-based detector 132 may utilize and/or communicate with systems implementing automated dependent surveillance-broadcast (ADS-B). In an embodiment, ADS-B is a system whereby each aircraft periodically determines the aircraft's current position using satellite navigation and broadcasts the determined current position so that other aircraft and/or devices on the ground may record the current position; this may enable first aircraft and/or flight controller 112 to determine position of at least a second aircraft 120 based on positions determined and broadcast by at least a second aircraft 120, and to determine trajectory, velocity, and/or other flight path information concerning the at least a second aircraft 120 using a plurality of such determined positions. ADS-B may implement two communication protocols, ADS-B-Out and ADS-B-In. ADS-B-Out may transmit aircraft position. In an embodiment, ADS-B-Out may improve the probability that both ground-based systems and/or aircraft can detect an aircraft that is broadcasting or transmitting information using ADS-B-Out. ADS-B-In may receive aircraft position and other state information at an aircraft such as first aircraft 104, from other aircraft. ADS-B may give aircraft equipped with ADS-B-In a better chance to remain well clear of other ADS-B-equipped aircraft. Communication-based detector 132 may include a system whereby aircraft, including without limitation toy aircraft, receive flight path information from one another and/or from one or more remote control devices; flight path information may include or be based on remote control commands issued to toy aircraft, modifications to such commands and/or to flight paths based on methods as disclosed in this disclosure, or the like. As a non-limiting example, toy aircraft may transmit remote-control commands and/or other flight path information to each other, remote controllers may transmit such commands to each other, and/or toy aircraft may receive such information from remote controllers controlling other toy aircraft. Persons skilled in the art, upon reviewing the entirety of this disclosure, will be aware of various ways in which flight path information may be communicated to and/or between toy aircraft as disclosed herein.

Still referring to FIG. 1, first aircraft and/or flight controller 112 may include, implement, and/or interact with one or more other technologies and procedures such as performance-based navigation (PBN), digital voice switching, and data communications (DATACOM). In an embodiment, when combined with trajectory-based operations (TBO) and decision support tools, components integrated in and/or communicating with first aircraft and/or flight controller 112 may provide a foundation for managing first aircraft 104 to achieve self-separation—functions to perform separation analogous to the visually-based requirement for manned aircraft to remain well separated from other aircraft, and collision avoidance. In an embodiment, automated self-separation may differ from the manned aircraft requirements to "remain well clear" in that automated self-separation involves calculation using a set of quantitative values to determine if an avoidance maneuver is necessary. Calculations and/or maneuvers may be performed as described in further detail below. First aircraft and/or flight controller 112 and/or another UAV may be authorized to use its self-separation capability for encounters between itself and an aircraft on visual flight rules (VFR); in this case, self-separation may be the responsibility of pilots of both aircraft.

System 100 may include one or more additional elements, including without limitation a trial maneuver code generator 136, which may generate maneuver codes for communication of collision avoidance maneuvers as described in further detail below; trial code maneuver generator may be incorporated in first aircraft 104 and/or flight controller 112. A performance database 140 may be used to store data concerning different types of aircraft, different critical values, or the like, as discussed in further detail below Referring now to FIG. 2, an exemplary embodiment of a method 200 of aircraft collision avoidance is illustrated. At step 205, a first aircraft 104 and/or a flight controller 112 detects at least a projected flight path of at least a second aircraft 120. Detection may include obtaining data describing at least a second aircraft 120 and determining the at least a projected flight from the data. Data may include, without limitation, at least a position of the at least a second aircraft 120; at least a position may include a sequence of positions, which may be associated with times during which at least a second aircraft 120 occupied each position in the sequence of positions. Data may include a speed of at least a second aircraft 120. Data may include a heading of at least a second aircraft 120. Data may include a path previously traveled by at least a second aircraft 120. Data may include an intended destination of at least a second aircraft 120. First aircraft and/or flight controller 112 may detect the at least a projected flight by receiving data describing at least a second aircraft 120 from and/or using an aircraft tracker 124, which may include a communication-based detector 132 and/or a local sensor 128.

Figure 2:
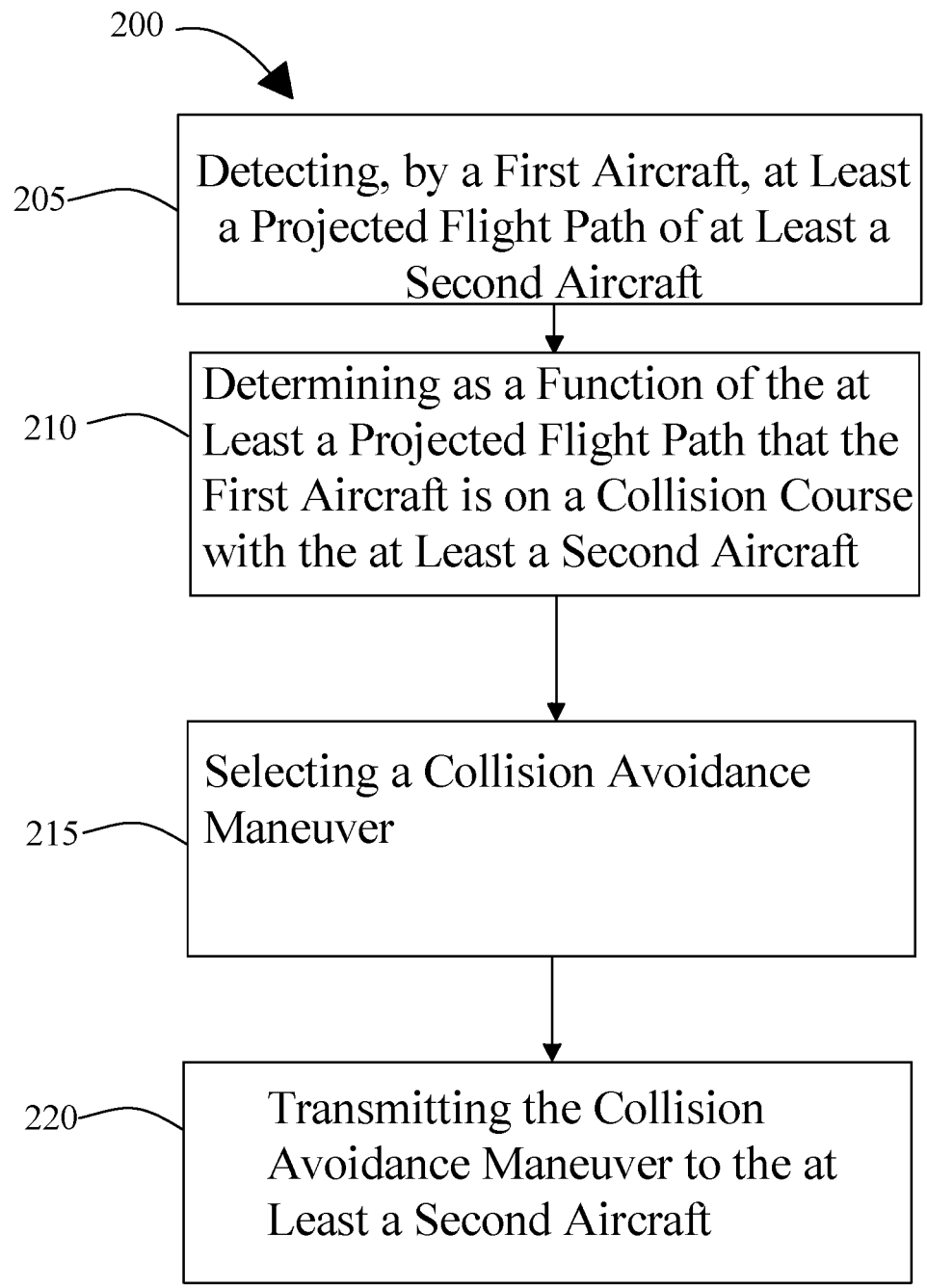
FIG. 2 is a flow diagram illustrating an exemplary embodiment of a method for aircraft collision avoidance.

With continued reference to FIG. 2, detecting the at least a projected flight path may include detecting at least a current position of the at least a second aircraft 120. Detecting the at least a projected flight path may include detecting at least a current velocity of the at least a second aircraft 120. Detecting the at least a projected flight path may include detecting the at least a projected flight path using automated dependent surveillance-broadcast (ADS-B). Detecting the at least a projected flight path may include detecting the at least a projected flight path using at least a sensor mounted on the first aircraft 104.

Still referring to FIG. 2, at least a projected flight path may be simulated according to an aircraft flight model. Aircraft flight model may function, without limitation, by adapting a kinematic algorithm for aircraft flight simulation where a horizontal acceleration of an aircraft is created by banking and the vertical acceleration for climb/descent is considered as a constant. Given an angle of bank ($\Psi$), the centripetal acceleration $a_c$ may be given, without limitation, by $a_c = g \tan \Psi$, where g is the gravitational acceleration, assuming that the aircraft maintains constant altitude during the banking, and TAS is the true airspeed of the aircraft. On a horizontal plane E-N in the East-North-Up coordinate system, given the true heading ($\theta$), the components of the centripetal acceleration on the East and North axis may be, respectively, $a_E = a_c \sin \theta + a_c \cos \theta$ and $a_N = a_c \cos \theta - a_c \sin \theta$. Where the acceleration may be simulated, for instance as described above, velocity and/or position of an aircraft may be updated; for instance in the East North Up coordinate system, velocity coordinates may be updated for the three axes as $V^i_E = TAS_{i-1} \sin \theta + a_E \, dt$, $V^i_N = TAS_{i-1} \cos \theta + a_N \, dt$ and $V^i_U = V^{i-1}_U + a_U \, dt$. A position of the aircraft may likewise be updated using modified heading and coordinate displacements. A modified heading $\theta_i$ may be calculated as $\theta_i = \tan(V^i_E/V^i_N)$. Displacement of east-north-up coordinates may be calculated as $dE = V^i_E \sin \theta_i \, dt + a_E \, dt^2/2$, $dN = V^i_N \cos \theta_i \, dt + a_N \, dt^2/2$, and $dU = V^i_U \, dt + a_U \, dt^2/2$. Geodetic coordinates may similarly be updated as $d\lambda = dE/[a(1-e^2 \sin^2\varphi)^{-1/2} + h]/\cos \varphi$, $d\varphi = dN/[a(1-e^2)((1-e^2 \sin^2 \varphi)^{3/2} + h]$, and $dh = dU$, where a and e are the semi-major axis and the first eccentricity squared defined by the WGS-84 model, respectively. Geodetic coordinates may be updated as $\varphi_i = \varphi_{i-1} + d\varphi$, $\lambda_i = \lambda_{i-1} + d\lambda$, and $h_i = h_{i-1} + dh$. These calculations are offered for illustrative purposes only and are not meant to be taken as limiting or comprehensive.

At step 210, first aircraft and/or flight controller 112 may determine that the first aircraft 104 is on a collision course with the at least a second aircraft 120 based on the at least a projected flight path. Determination may include determination of a projected flight path of first aircraft 104, which may be accomplished using any methods described above for determination of a projected flight path of at least a second aircraft 120; determination that first aircraft 104 is on a collision course with at least a second aircraft may include determination projected paths of first aircraft 104 and at least a second aircraft 120 come within a threshold distance within one another. Determining that the first aircraft 104 is on a collision course with the at least a second aircraft 120 may include calculating at least a distance between first aircraft 104 and at least a second aircraft 120. Determining that the first aircraft 104 is on a collision course with the at least a second aircraft 120 may include calculating at least a closure velocity between the first aircraft 104 and the at least a second aircraft 120. Determining that the first aircraft 104 is on a collision course with the at least a second aircraft 120 may include calculating an estimated time of collision. First aircraft 104 may compare estimated time of collision to a threshold value and determine that the first aircraft 104 is on a collision course as a function of the comparison; threshold may represent a "critical value" of time from the present. Critical value may be recorded in a database and may depend on types of each aircraft in question; for instance, some aircraft having lesser maneuverability may have a larger critical value, to allow more time for evasion of collisions.

Figure 3:
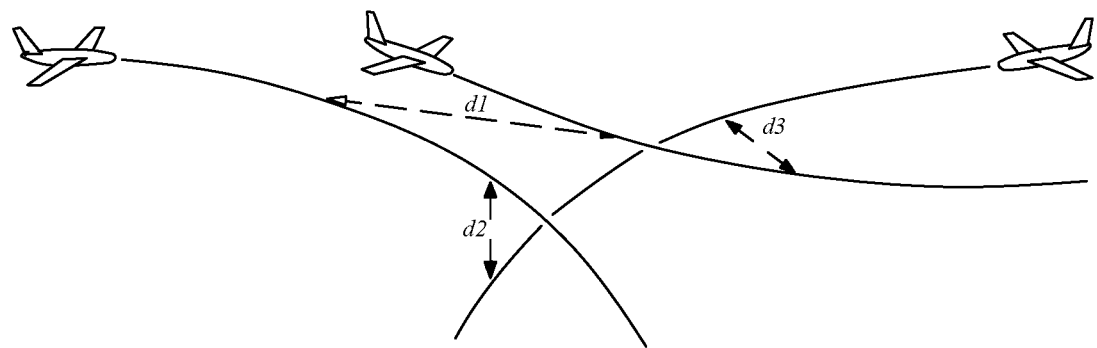
FIG. 3 is a schematic diagram illustrating minimum distances between paths in an exemplary embodiment.

As a non-limiting example, and still referring to FIG. 2, first aircraft 104 and/or flight controller 112 may calculate the distances (d) among aircraft, including without limitation distances between first aircraft 104 and each aircraft of at least a second aircraft 120, and/or distances between each aircraft of at least a second aircraft 120 and each other aircraft of at least a second aircraft 120; calculation of distances may be calculated using, without limitation, current positions of first aircraft 104 and at least a second aircraft 120, which may be detected according to any process for detection as described above. As a non-limiting example, a distance d between two aircraft having position coordinates $(X_1, Y_1, Z_1)$ and $(X_2, Y_2, Z_2)$, respectively, in a coordinate system such as the Earth-Centered Earth-Fixed coordinate system, may be given by $d=[(X_1-X_2)^2+(Y_1-Y_2)^2+(Z_1-Z_2)^2]^{1/2}$. Earth-Centered Earth-Fixed coordinates may be converted from the geodetic coordinates and/or east-north-up coordinates according to any suitable method, including without limitation by using the WGS-84 model. First aircraft 104 and/or flight controller 112 may calculate closure velocities ($v_c$) among aircraft; closure velocities may include speeds at which each first aircraft 104 and each aircraft of at least a second aircraft 120 are approaching each other and/or speeds at which each aircraft of at least a second aircraft 120 is approaching each other aircraft of at least a second aircraft 120. As a non-limiting example, a closure velocity $v_c$ between aircraft may be calculated, without limitation, as $v_c=(d_i-d_{i-1})/dt$, where di is the light-of-sight distance between aircraft at step i, $d_{i-1}$ is the line-of-sight distance between aircraft at step i−1, and dt is the time interval between steps i and i−1. A closure velocity greater than zero may indicate that the two aircraft are moving apart, while a closure velocity less than zero may indicate that the two aircraft are moving toward one another. First aircraft 104 and/or flight controller 112 may use distances and closure velocities as described above to estimate the time of collision as a non-limiting example, time of collision t between a pair of aircraft separated by a distance d an approaching one another at a velocity $v_c$ may be calculated as ($t=d/v_c$). Estimated time of collision t may be compared with a threshold and/or critical value during the flight; where the estimated time of collision t is less than the critical value and/or threshold value, first aircraft 104 and/or flight controller 112 may proceed to subsequent steps of method 200. A collision alert may be generated and/or transmitted to one or more other aircraft, persons, and/or systems on the ground. For the purposes of illustration, FIG. 3 depicts the concept of sense-and-avoid with the illustration of shortest distances between 4-D trajectories of multiple numbers of aircraft. The shortest distance between 4-D trajectories may be calculated by taking the minimum value of the distances between two aircraft for the time duration to be considered.

In an embodiment, a future collision may be assumed where an aircraft of at least a second aircraft 120 is projected to enter a collision volume of first aircraft, which may be a volume defined around the first aircraft 104 entry into which by another aircraft is closely associated with collision; where projected paths are calculated for both first aircraft 104 and at least a second aircraft 120, a future collision may be assumed when a projected path of any aircraft of first aircraft 104 and at least a second aircraft 120 predicts passage through any collision volume of any other aircraft of first aircraft 104 and at least a second aircraft 120.

Referring again to FIG. 2, at step 215 first aircraft 104 and/or flight controller 112 selects a collision avoidance maneuver, the collision avoidance maneuver including at least a flight path for the first aircraft 104 and at least a flight path for the at least a second aircraft 120. Selecting collision avoidance maneuver may include simulating a plurality of potential future trajectories for at least one of the first aircraft 104 and the at least a second aircraft 120 and selecting at least one of the flight path for the first aircraft 104 and the at least a flight path for the second aircraft from the plurality of potential future trajectories. Plurality of trajectories may include without limitation trajectories associated with maneuver codes as described in further detail below. For instance, and without limitation, a projected path of travel may be calculated, using any methods as described above for determination and/or calculation of projected paths of travel for aircraft, given each potential change in heading represented by each of one or more maneuver codes as described below; a projected path may be determined and/or calculated for a change in heading corresponding to each maneuver code, and may be performed for each aircraft of first aircraft and at least a second aircraft. This may include, without limitation, calculation and/or determination of such paths for aircraft of at least a second aircraft that are not currently on a collision course with first aircraft 104, as determined above; such determinations may be used to ensure that any collision avoidance maneuver selected as described in this disclosure does not create a new collision and/or potential collision as a result of intersecting a path of an additional aircraft. Selecting the at least one of the flight path for the first aircraft 104 and the at least a flight path for the second aircraft may include selecting at least a flight path that maximizes separation between the first aircraft 104 and the at least a second aircraft 120. For instance, first aircraft 104 and/or flight controller 112 may operate a maneuver code selection algorithm, wherein the shortest line-of-sight between all pairs of aircraft for each 4-D trajectory simulation is recorded, and multiple simulations are conducted. A maneuver that produces the greatest overall line-of-sight distance may be selected from the multiple simulations.

Still referring to FIG. 2, selected at least a flight path may be used by the first aircraft 104 to execute the avoidance using on-board surveillance; for instance, where only the first aircraft 104 is able to do any avoidance maneuver and/or one or more of second aircraft does not acknowledge receiving communication as described below, first aircraft 104 may follow a selected at least a flight path. Regardless of whether ATC separation services are provided, a UAV, including without limitation first aircraft 104 and/or at least a second aircraft 120 may act to prevent another aircraft from penetrating a UAV collision volume. First aircraft 104 may continuously operate an automated collision avoidance process to be performed if communication with at least a second aircraft 120 should fail for any reason. Alternatively or additionally, a pilot in command, such as a pilot remotely operating first aircraft 104, may override maneuvers and/or perform additional commands to avoid collision according to judgment of the pilot.

At step 220, first aircraft 104 and/or flight controller 112 transmits the collision avoidance maneuver to the at least a second aircraft 120. Transmission may be effected using any direct or indirect communication protocol, such as radio transmission from one aircraft to another, transmission relayed via another aircraft or a ground-based device, or the like. First aircraft 104 and/or flight controller 112 may transmit information in any suitable form, including in packet-based form, textual form, and/or a form specified by one or more communication protocols used in aircraft, transponder protocols used in aircraft, or the like. In an embodiment, first aircraft 104 and/or flight controller 112 may transmit a collision avoidance maneuver to be undertaken by first aircraft 104 alone, such as a modified path that first aircraft 104 has selected to avoid collision. First aircraft 104 may alternatively or additionally transmit a collision avoidance maneuver that specifies paths for both first aircraft 104 and at least a second aircraft 120 to follow; for instance, collision avoidance maneuver may describe a set of paths that all of first aircraft 104 and at least a second aircraft 120 will travel to avoid collision. In an embodiment, where paths are specified for all aircraft, transmission of collision avoidance maneuver may avoid the possibility that aircraft will accidently maneuver into a new collision scenario in an attempt to avoid an earlier detected collision.

Figure 4:
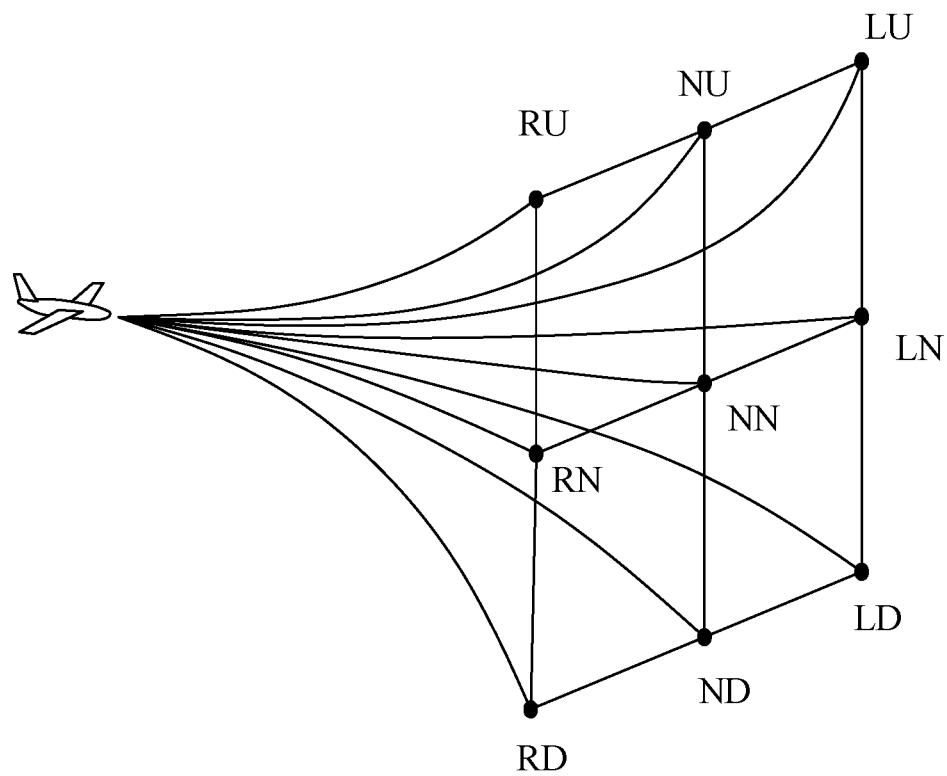
FIG. 4 is a schematic diagram illustrating an exemplary embodiments of maneuver codes.

Still viewing FIG. 2, transmitting the collision avoidance maneuver to the at least a second aircraft 120 may include transmitting a maneuver label code describing the flight path for the first aircraft 104. For instance and without limitation, maneuvers may be described using codes for simple exchange of information. Codes may correspond to different trajectories as described as deviations from current path of aircraft, by reference to current orientation of aircraft. For instance, and by way of illustration only, a maneuver code may include a first code letter (L="left turn", R="right turn," N="no turn") describing horizontal component of direction change, while a second code letter (U="up," D="Down", N=no change) indicates vertical trajectory change component; as a result, RN may indicate a maneuver characterized as "turning right, not ascending or descending," while "LU" may indicate a maneuver for turning left and climbing. FIG. 4 is a schematic diagram illustrating maneuver codes and associated paths according to the above-described example in an embodiment, illustrating maneuvers to be performed for each of nine maneuver codes: RU, NU, LU, RN, NN, LN, RD, ND, and LD. In an embodiment, a maneuver code is designed to command an aircraft to conduct a proper avoid maneuver in the clearest and simplest way.

Referring again to FIG. 2, first aircraft 104 and/or flight controller 112 may transmit one or more additional elements of data, including without limitation indicated airspeed, climb or descend rate, and angle of bank, from the pre-defined and authorized data. Each aircraft of first aircraft 104 and at least a second aircraft 120 may perform the broadcast and/or accepted collision avoidance maneuver by performing its assigned collision avoidance path.

Still referring to FIG. 2, additional protocols may be implemented where two or more aircraft and/or flight controllers 112 are communicating collision avoidance maneuvers as described above; for instance, where two aircraft or corresponding flight controllers 112 each determine collision avoidance maneuvers as described above and transmit them, one or more protocols may be implemented to avoid conflicting maneuvers and/or communication delays due to recalculation of maneuvers. In an embodiment, where two or more such maneuvers are identical, each aircraft may adopt the transmitted maneuvers. Where two or more maneuvers differ, first aircraft 104, flight controller 112, and/or other aircraft or flight controllers 112 may implement a decision protocol that predictably selects a "winning" maneuver. For instance, the first-transmitted maneuver may "win" and be adopted. Alternatively or additionally, each aircraft may calculate a predictable mathematical function of each transmission, such as a "checksum" or other algorithm, such that each aircraft drives the same output for a given transmission as each other aircraft; as a result, each aircraft may end up with a set of numbers representing the set of transmissions. Selection of the "winning" transmission may thereafter be accomplished by selection of the numerically greatest number generated using the predictable mathematical functions, or the like; for example, first aircraft may subject its own maneuver and maneuvers received from each other aircraft to a checksum procedure, getting a list of numbers corresponding to the list of maneuvers, compare the numbers in the list to each other to find the greatest number in the list, then select the maneuver from which the greatest number was generated.

In an embodiment, and continuing to refer to FIG. 2, one or more aircraft of at least a second aircraft 120 may not be equipped to perform method 200, may perform a different communication process, and/or may have disabled communication. Each aircraft practicing an embodiment of method 200 may transmit an acknowledgement code indicating that the aircraft is going to perform its portion of the collision avoidance maneuver. Where first aircraft 104 does not receive an acknowledgement code from an aircraft of at least a second aircraft 120, first aircraft 104 may perform one or more contingency processes. Contingency processes may include transmitting a communication to another aircraft according to a different communication protocol; for instance, and without limitation, first aircraft 104 may convey a message indicating a maneuver that first aircraft 104 and/or one or more aircraft of second aircraft are going to perform, so that an aircraft operating a protocol whereby each aircraft communicates its maneuver to each other aircraft may perform evasive maneuvers according to its protocol. Similarly, first aircraft 104 may communicate maneuvers, maneuver codes, and/or other messages to ground surveillance and/or systems implementing ADS-B, Mode-S, or the like; this may be done concurrently with other parts of method 2, permitting such ground surveillance and/or systems to perform "backup" communications as needed. In an embodiment where a second aircraft of at least a second aircraft 120 is unable to communicate or not responding to communication, first aircraft 104 and/or at least a second aircraft 120 may simulate a probable future path for the non-communicative aircraft, which may be based on a statistically most likely evasive maneuver, or may include several statistically likely evasive maneuvers; other aircraft, first aircraft 104 and/or flight controller 112 may compute evasive maneuvers based on avoiding that likely future path or those likely future paths.

Figure 5:
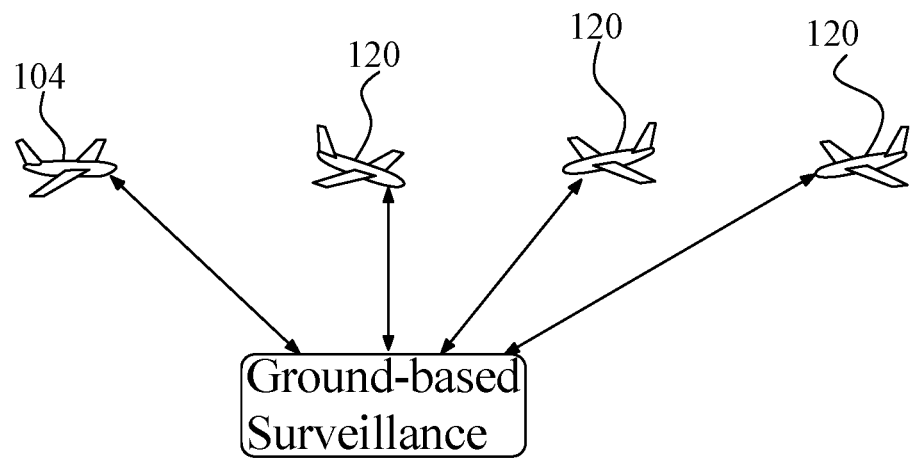
FIG. 5 is a schematic diagram illustrating an exemplary embodiment of the system incorporating ground surveillance.

As noted above, and still referring to FIG. 2, one or more steps of embodiments of method 200 and/or elements of system 100 may be implemented on a ground surveillance system and/or other remote device 116 as described above. For instance, a ground-based surveillance system may gather aircraft flight data and conduct one or more steps of embodiments of method 200. FIG. 5 depicts ground-based sense-and-avoid system with multiple 4-D trajectory simulations to generate maneuver code for maximum separation.

Figure 6:
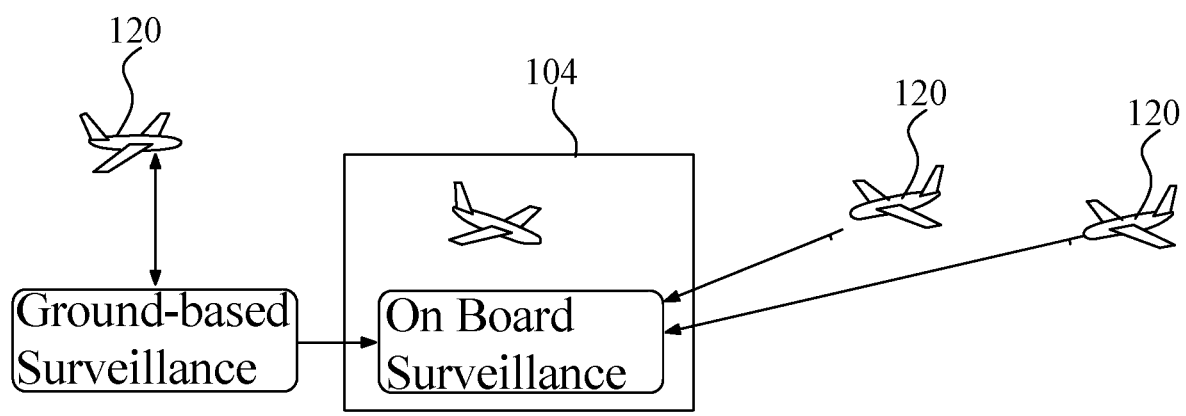
FIG. 6 is a schematic diagram illustrating an exemplary embodiment of the system incorporating ground surveillance.

Alternatively or additionally, a ground-based surveillance assistant on-board surveillance system may perform one or more steps of embodiments of method 200. As a non-limiting example, FIG. 6 depicts ground-surveillance-assistant on-board sense-and-avoid system with multiple 4-D trajectory simulations to generate maneuver code for maximum separation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
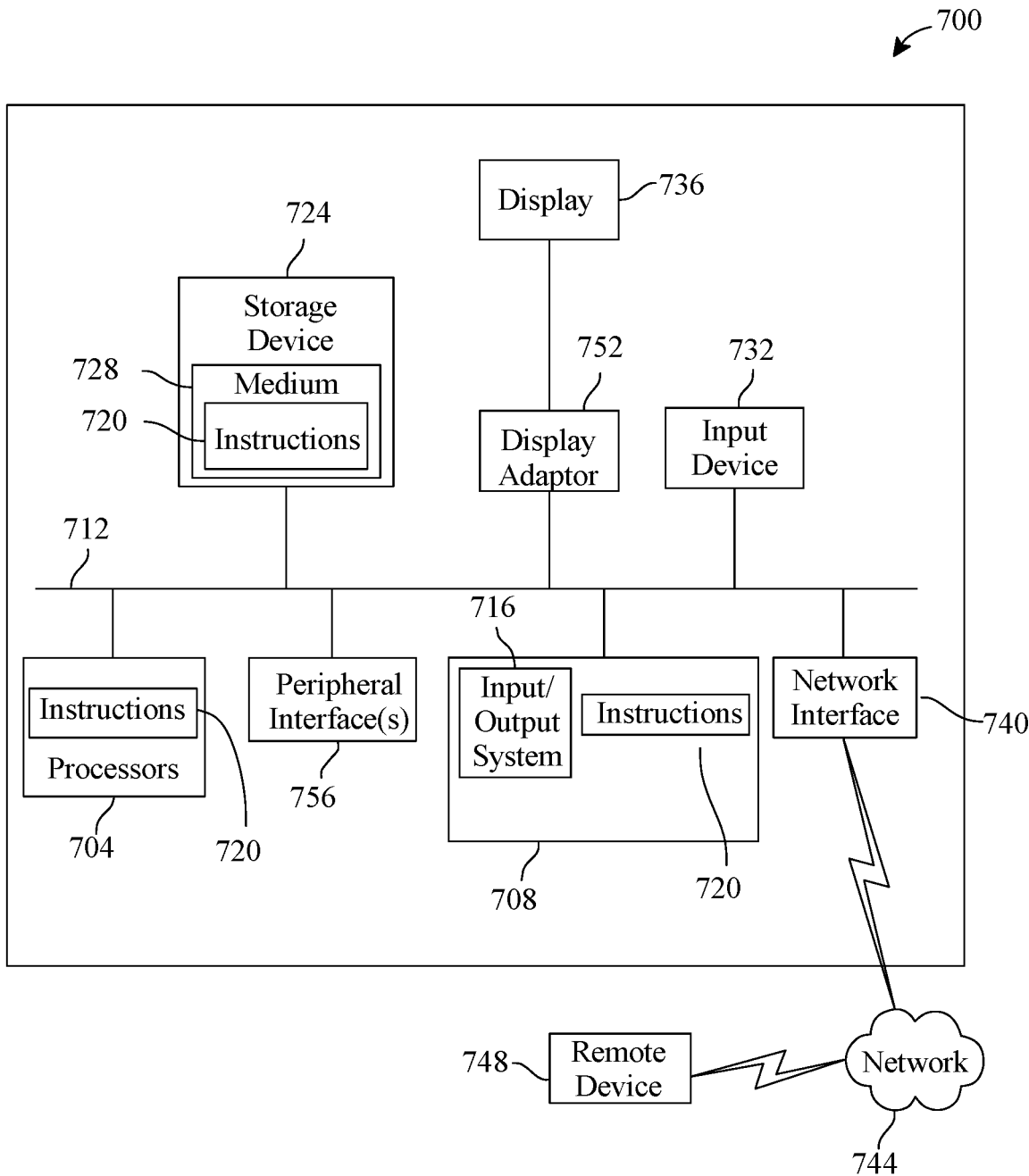
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of aircraft collision avoidance, the method comprising:
    detecting, by a first aircraft, at least a projected flight path of at least a second aircraft;
    determining, by the first aircraft and as a function of the at least a projected flight path, that the first aircraft is on a collision course with the at least a second aircraft;
    selecting, by the first aircraft, a collision avoidance maneuver, the collision avoidance maneuver including at least a flight path for the first aircraft and at least a flight path for the at least a second aircraft; and
    transmitting the collision avoidance maneuver to the at least a second aircraft so that both the first aircraft and the at least a second aircraft travel along the respective at least a flight paths of the collision avoidance maneuver.

2. The method of claim 1, wherein detecting the at least a projected flight path further comprises detecting at least a current position of the at least a second aircraft.

3. The method of claim 1, wherein detecting the at least a projected flight path further comprises detecting at least a current velocity of the at least a second aircraft.

4. The method of claim 1, wherein detecting the at least a projected flight path further comprises detecting the at least a projected flight path using automated dependent surveillance-broadcast (ADS-B).

5. The method of claim 1, wherein detecting the at least a projected flight path further comprises detecting the at least a projected flight path using at least a sensor mounted on the first aircraft.

6. The method of claim 1, wherein determining that the first aircraft is on a collision course with the at least a second aircraft further comprises calculating at least a distance between first aircraft and at least a second aircraft.

7. The method of claim 1, wherein determining that the first aircraft is on a collision course with the at least a second aircraft further comprises calculating at least a closure velocity between the first aircraft and the at least a second aircraft.

8. The method of claim 1, wherein determining that the first aircraft is on a collision course with the at least a second aircraft further comprises calculating an estimated time of collision.

9. The method of claim 8 further comprising comparing the estimated time of collision to a threshold value and determining that the first aircraft is on a collision course as a function of the comparison.

10. The method of claim 1, wherein selecting the collision avoidance maneuver further comprises:
    simulating a plurality of potential future trajectories for at least one of the first aircraft and the at least a second aircraft; and
    selecting at least one of the flight path for the first aircraft and the at least a flight path for the second aircraft from the plurality of potential future trajectories.

11. The method of claim 10, wherein selecting the at least one of the flight path for the first aircraft and the at least a flight path for the second aircraft further comprises selecting at least a flight path that maximizes separation between the first aircraft and the at least a second aircraft.

12. The method of claim 1, wherein transmitting the collision avoidance maneuver to the at least a second aircraft further comprises transmitting a maneuver label code describing the flight path for the first aircraft.

13. The method of claim 1, wherein transmitting the collision avoidance maneuver to the at least a second aircraft further comprises transmitting a maneuver label code describing a flight path for the at least a second aircraft to the at least a second aircraft.

14. A system for aircraft collision avoidance, the system comprising:
a first aircraft, the first aircraft configured to detecting at least a projected flight path of at least a second aircraft, determine, as a function of the at least a projected flight path, that the first aircraft is on a collision course with the at least a second aircraft, select a collision avoidance maneuver, the collision avoidance maneuver including at least a flight path for the first aircraft and at least a flight path for the at least a second aircraft, and transmit the collision avoidance maneuver to the at least a second aircraft so that both the first aircraft and the at least a second aircraft travel along the respective at least a flight paths of the collision avoidance maneuver.

15. The system of claim 14, wherein the first aircraft is configured to transmit the collision avoidance maneuver to the at least a second aircraft by transmitting a maneuver label code describing the flight path for the first aircraft.

16. The system of claim 14, wherein the first aircraft is configured to transmit the collision avoidance maneuver to the at least a second aircraft by transmitting a maneuver label code describing a flight path for the at least a second aircraft to the at least a second aircraft.

17. A system for aircraft collision avoidance, the system comprising:
a flight controller, the flight controller configured to detect a projected flight path of a first aircraft and at least a projected flight path of at least a second aircraft, determine, as a function of the at least a projected flight path, that the first aircraft is on a collision course with the at least a second aircraft, select a collision avoidance maneuver, the collision avoidance maneuver including at least a flight path for the first aircraft and at least a flight path for the at least a second aircraft, and transmit the collision avoidance maneuver to the at least a second aircraft so that both the first aircraft and the at least a second aircraft travel along the respective at least a flight paths of the collision avoidance maneuver.

18. The system of claim 17, wherein the flight controller is configured to transmit the collision avoidance maneuver to the first aircraft.

19. The system of claim 17, wherein the flight controller is configured to transmit the collision avoidance maneuver to the at least a second aircraft by transmitting a maneuver label code describing the flight path for the first aircraft.

20. The system of claim 17, wherein the flight controller is configured to transmit the collision avoidance maneuver to the at least a second aircraft by transmitting a maneuver label code describing a flight path for the at least a second aircraft to the at least a second aircraft.

* * * * *